US012645020B2

(12) United States Patent
Pankratz et al.

(10) Patent No.: US 12,645,020 B2
(45) Date of Patent: Jun. 2, 2026

(54) OPTICAL SYSTEM AND HEADS UP DISPLAY SYSTEMS

(71) Applicant: 3M INNOVATIVE PROPERTIES COMPANY, St. Paul, MN (US)

(72) Inventors: Stephan J. Pankratz, Eagan, MN (US); Nathaniel K. Naismith, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 707 days.

(21) Appl. No.: 17/781,863

(22) PCT Filed: Nov. 30, 2020

(86) PCT No.: PCT/IB2020/061269
§ 371 (c)(1),
(2) Date: Jun. 2, 2022

(87) PCT Pub. No.: WO2021/111273
PCT Pub. Date: Jun. 10, 2021

(65) Prior Publication Data
US 2023/0017066 A1 Jan. 19, 2023

Related U.S. Application Data

(60) Provisional application No. 62/943,856, filed on Dec. 5, 2019.

(51) Int. Cl.
| | |
|---|---|
| *G02F 1/13363* | (2006.01) |
| *B60K 35/22* | (2024.01) |
| *B60K 35/231* | (2024.01) |
| *B60K 35/28* | (2024.01) |
| *G02B 5/30* | (2006.01) |
| *G02B 27/01* | (2006.01) |

(52) U.S. Cl.
CPC ........... *G02B 5/3066* (2013.01); *B60K 35/22* (2024.01); *B60K 35/231* (2024.01); *B60K 35/28* (2024.01); *G02B 5/305* (2013.01); *G02B 27/0101* (2013.01); *G02F 1/133638* (2021.01); *B60K 2360/23* (2024.01); *G02F 2413/01* (2013.01)

(58) Field of Classification Search
CPC ......... G02F 1/133638; G02F 1/133528; G02F 1/133531; B29D 11/00644; B32B 2307/42; G02B 5/3025; G02B 5/3066; G02B 27/283; G02B 5/305; G02B 27/0101; G02B 2027/0185; G02B 5/3083; B60K 35/23; B60K 2360/23
See application file for complete search history.

(56) References Cited

U.S. PATENT DOCUMENTS

| | | | |
|---|---|---|---|
| 5,537,144 A | 7/1996 | Faris et al. | |
| 5,882,774 A | 3/1999 | Jonza et al. | |
| 6,179,948 B1 | 1/2001 | Merrill et al. | |
| 6,703,989 B1 | 3/2004 | Harrold | |
| 6,783,349 B2 | 8/2004 | Neavin et al. | |
| 9,030,749 B2 | 5/2015 | Lescure et al. | |
| 2011/0134352 A1* | 6/2011 | Nakagawa | G02F 1/1345 349/43 |
| 2011/0157698 A1 | 6/2011 | Yoshimi | |
| 2012/0253061 A1 | 10/2012 | Takahashi | |
| 2012/0307359 A1 | 12/2012 | Matsuyama et al. | |
| 2015/0061976 A1 | 3/2015 | Ferri et al. | |
| 2016/0291228 A1* | 10/2016 | Lee | G02B 5/3016 |
| 2017/0045737 A1 | 2/2017 | Cammenga | |
| 2017/0176844 A1* | 6/2017 | Aoki | G03B 21/005 |
| 2018/0124364 A1* | 5/2018 | Yata | H04N 9/3182 |
| 2019/0096121 A1 | 3/2019 | Kang et al. | |
| 2019/0149781 A1 | 5/2019 | Yata | |
| 2020/0017029 A1* | 1/2020 | Taguchi | G02F 1/13471 |
| 2020/0319388 A1* | 10/2020 | Ambur | G02B 27/0172 |
| 2020/0379226 A1* | 12/2020 | Steiner | G02B 27/283 |
| 2021/0096433 A1* | 4/2021 | Shim | G02F 1/1368 |

FOREIGN PATENT DOCUMENTS

| | | |
|---|---|---|
| EP | 1411321 B1 | 4/2017 |
| GB | 2557231 A | 6/2018 |
| JP | 2012022148 A | 2/2012 |
| WO | 2018151761 A1 | 8/2018 |
| WO | 2019082106 A1 | 5/2019 |

OTHER PUBLICATIONS

International Search Report for PCT International Application No. PCT/IB2020/061269, mailed on Feb. 16, 2021, 3 pages.

* cited by examiner

Primary Examiner — Jonathan Y Jung
(74) Attorney, Agent, or Firm — Jonathan L. Tolstedt

(57) ABSTRACT

An optical system includes a display system including a display having first and second display pixels interspersed with each other across the display. The first and second display pixels emit superimposed different respective first and second images polarized along the first direction. The display system includes a patterned retarder having pluralities of first and second retarder pixels aligned and registered with the respective first and second display pixels in one-to-one correspondence. The first retarder pixels are configured to receive and transmit the first emitted image as the first output image polarized along the first direction. The second retarder pixels are configured to receive, change the polarization direction, and transmit the second emitted image as the second output image polarized along the second direction. A reflective polarizer is configured to receive the first and second output images and substantially transmit the first output image and substantially reflect the second output image.

9 Claims, 3 Drawing Sheets

OPTICAL SYSTEM AND HEADS UP DISPLAY SYSTEMS

CROSS REFERENCE TO RELATED APPLICATIONS

This application is a national stage filing under 35 U.S.C. 371 of IB2020/061269, filed Nov. 30, 2020, which claims the benefit of U.S. Provisional Application No. 62/943,856, filed Dec. 5, 2019, the disclosures of which are incorporated by reference in their entireties herein.

TECHNICAL FIELD

The disclosure generally relates to optical systems, particularly to optical systems for displaying virtual first and second output images for viewing by a viewer, and to heads up display systems including the optical system.

BACKGROUND

Electronic displays are provided in many applications to render digital information to a viewer. A head-up display (HUD) allows a viewer to view not only the information, but also a view through the HUD due to the transparent nature of the HUD. Thus, a viewer may be able to view the displayed information while not losing the ability to view the real world through the HUD. HUD systems have been developed particularly for use in high-speed vehicles such as aircraft, but are now increasingly being considered as a feature for other vehicles, including automobiles. In smaller scale, HUD systems are used as goggle lenses or helmet visors, or in other diverse virtual reality (VR) applications. The HUD may be implemented in a variety of surfaces and windows, for example, the front windshield of a vehicle. Thus, for an occupant in the vehicle, vehicle operational information, such as vehicle speed and/or navigation directions, or the like, may be displayed to the occupant on, say, the front windshield accordingly.

SUMMARY

Some aspects of the disclosure relate to an optical system including a display system. The display system is configured to output a first output image polarized along a first direction and a second output image polarized along an orthogonal second direction. The display system includes a display having pluralities of first and second display pixels interspersed with each other across the display. The first and second display pixels are configured to emit superimposed different respective first and second images polarized along the first direction. The display system also includes a retarder disposed on the display. The retarder includes pluralities of first and second retarder pixels aligned and registered with the respective first and second display pixels in one-to-one correspondence. The first retarder pixels are configured to receive the first emitted image, not change the polarization direction of the first emitted image, and transmit the first emitted image as the first output image polarized along the first direction. The second retarder pixels are configured to receive the second emitted image, change the polarization direction of the second emitted image from the first direction to the second direction, and transmit the second emitted image as the second output image polarized along the second direction. The optical system includes a reflective polarizer configured to receive the first and second output images and substantially transmit the first output image and substantially reflect the second output image.

Some other aspects of the disclosure relate to a heads-up display. The heads-up display includes an optical system wherein the heads up display displays the first and second output images for viewing by a viewer.

BRIEF DESCRIPTION OF DRAWINGS

The various aspects of the disclosure will be discussed in greater detail with reference to the accompanying figures where, FIG. 1 schematically shows the optical system according to some embodiments of the disclosure.

The figures are not necessarily to scale. Like numbers used in the figures refer to like components. However, it will be understood that the use of a number to refer to a component in a given figure is not intended to limit the component in another figure labelled with the same number.

DETAILED DESCRIPTION OF ILLUSTRATIVE EMBODIMENTS

In the following description, reference is made to the accompanying drawings that form a part hereof and in which various embodiments are shown by way of illustration. It is to be understood that other embodiments are contemplated and may be made without departing from the scope or spirit of the present description. The following detailed description, therefore, is not to be taken in a limiting sense.

Embodiments of the disclosure describe a system and method of using a single imager to create two virtual images at two different image planes, having either the same or orthogonal polarization states. In some aspects, a patterned retarder may be registered to the image-forming pixels on an LCD imager to produce two interleaved images with orthogonal polarizations. The two interleaved images are subsequently separated into two paths using, for instance, a high-contrast reflective polarizer. The polarization of the second path image may be converted to the polarization of the first path image through a quarter wave layer added to a mirror in the second path.

Figure 1:
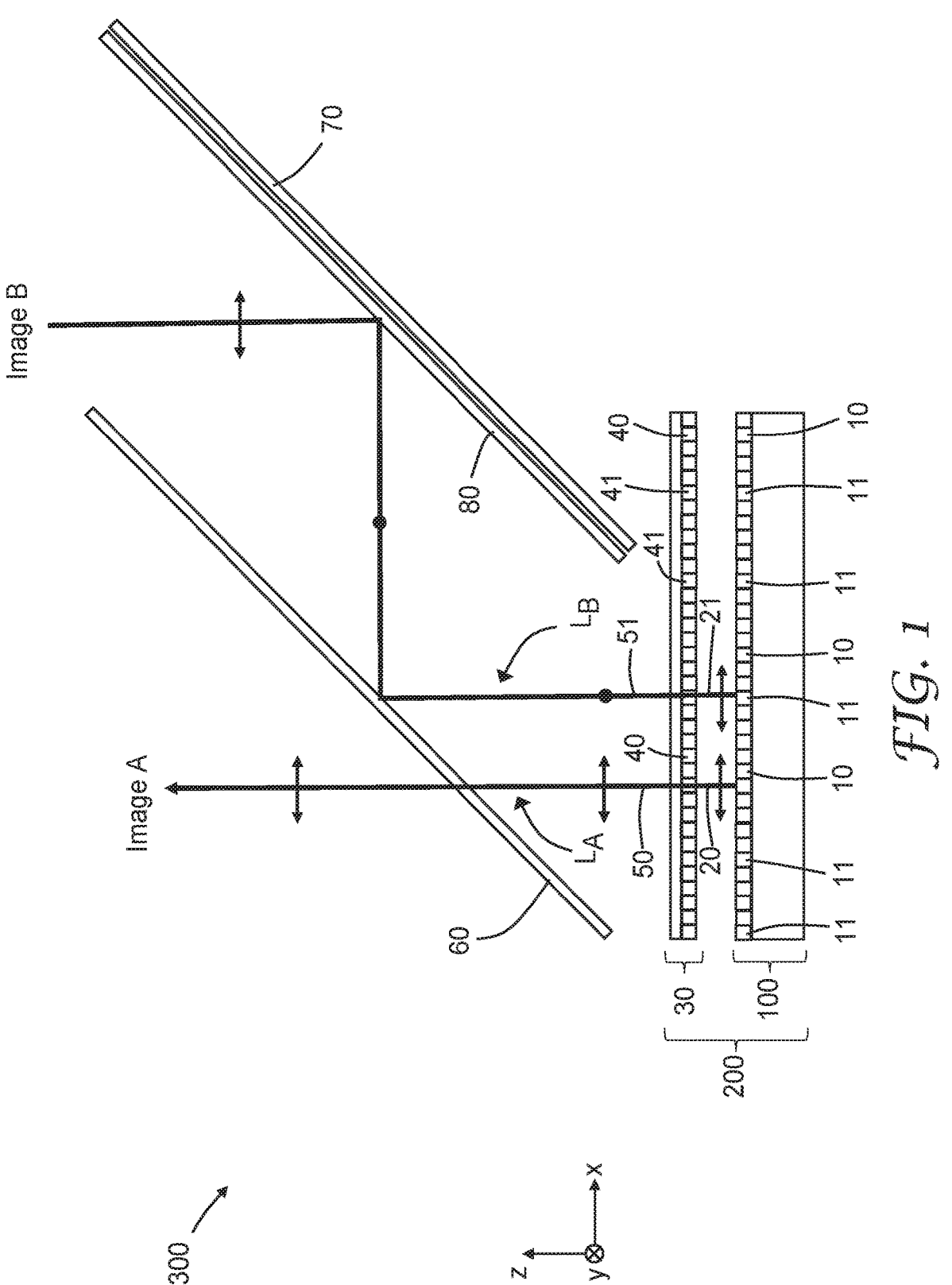
Figure 2:
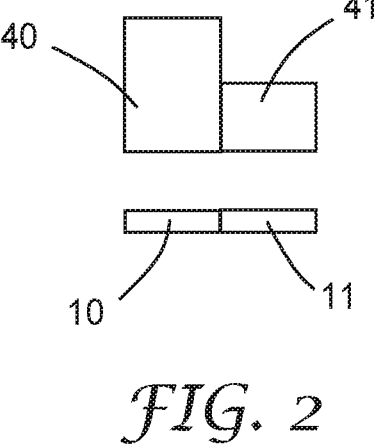
FIG. 2 schematically shows the retarder pixels and corresponding display pixels according to some aspects of the disclosure.

Some embodiments will be described herein with reference to FIGS. 1-3. As illustrated in FIG. 1, an optical system (300) includes a display system (200) having a display (100). The display system (200) is configured to output a first output image (50) and a second output image (51). The first output image (50) may be polarized along a first direction (x-axis) and the second output image (51) may be polarized along an orthogonal second direction (y-axis).

The display (100) includes pluralities of first (10) and second (11) display pixels interspersed with each other across the display (100). The first and second display pixels (10, 11) may be configured to emit different respective first (20) and second (21) images polarized along a first direction (x-axis). The emitted first and second images (20, 21) may be superimposed on each other. For instance, the optical system (300) superimposes the first image (20) that travels through a first optical path and the second image (21) that travels through a second optical path. The optical path length ($L_B$) of the second optical path may be different from an optical path length ($L_A$) of the first optical path. In some aspects, the optical path length ($L_B$) of the second optical path may be longer than the optical path length ($L_A$) of the first optical path.

In some embodiments, the display (100) may be a liquid crystal display (LCD) panel, for example. The LCD panel (100) may be a monochrome type provided with no color filters or a color type having RGB pixels. The LCD panel (100) according to the present disclosure is, however, not limited to these types. The LCD panel (100) may receive light emitted from a backlight unit (not illustrated) and generates the first and second images. The LCD panel (100) may be a general LCD panel, such as a TFT liquid crystal monitor employing an active matrix technology, or the like. The LCD panel (100) may include a polarizing filter for absorbing light polarized in one direction and a liquid crystal layer for rotating a polarization direction. In the illustrated embodiment, first and second image light carrying the first and second images (20, 21) emitted by the first and second display pixels (10, 11) of the LCD panel (100) are polarized in the same (first) direction (x-axis).

In other instances, the display (100) may include an emissive microdisplay, such as an OLED (Organic Light Emitting Device) display, and/or a reflective microdisplay, such as an LCoS (Liquid Crystal on Silicon) display or digital light processing (DLP) device. The display (100) may have any suitable location relative to other optical components. In other embodiments the display (100) may be a projection display.

In some embodiments, the display system (200) includes a retarder (30) disposed on the display (100). The retarder (30) includes retarder pixels. In some embodiments, the retarder pixels include pluralities of first (40) and second (41) retarder pixels. The first retarder pixels (40) are aligned and registered with the first display pixels (10) and the second retarder pixels (41) are aligned and registered with the second display pixels (11) in one-to-one correspondence as best shown in FIG. 2. In some aspects, the retarder layer (30) may include patterned retarders aligned and registered to the display pixels on the LCD imager (100). Patterned retarders are described elsewhere in International Appl. Pub. Nos. WO2018/151761 (Wheatley et al.) and WO2019/082106 (Etter, Jo A. et al.). A wide variety of patterned polymeric retarders may be formed using a combination of coating steps, application of masks and etching steps. The patterned retarder thus formed may be applied on the surface of the display (100), or may even be formed while applied on the surface of the display pixels (10, 11).

In some embodiments, the first retarder pixels (40) may be zero or full-wave retarders and the second retarder pixels (41) may be half-wave retarders. As illustrated in FIG. 2, the first retarder pixels (40) may be formed to be twice as thick as the second retarder pixels (41). For instance, the different thickness of the retarder pixels are obtained by forming a plurality of retarder pixels having uniform thickness as that of the first retarder pixels (40) and, subsequently, using photolithography or other similar techniques, some pixels are etched to obtain the thickness of the second retarder pixels (41).

According to an embodiment, the first retarder pixels (40) are configured to receive and transmit the first emitted image (20) as the first output image (50) without changing the polarization direction of the first emitted image (20). In some aspects, the first emitted image (20) may be polarized along the first direction (x-axis), and the first output image (50) transmitted by the first retarder pixels (40) may also be polarized along the first direction (x-axis).

The second retarder pixels (41) are configured to receive and transmit the second emitted image (21) by changing the polarization direction of the second emitted image (21). In some aspects, the second emitted image (21) may be polarized along the first direction (x-axis), and the second retarder pixels (41) changes the polarization of the second emitted image (21) from the first direction (x-axis) to the second direction (y-axis), and transmits the second emitted image (21) as the second output image (51) polarized along the second direction (y-axis).

For instance, in some embodiments, about half of the pluralities of retarder pixels are configured to transmit the first emitted image (20) as the first output image (50) polarized along the first direction (x-axis) and about half of the retarder pixels are configured to change the polarization and transmit the second emitted image (21) as the second output image (51) polarized along the second direction (y-axis).

In some aspects, the optical system (300) includes a reflective polarizer (60). The pixelated output from the display system (200) having orthogonal polarization states is directed toward the reflective polarizer (60). Reflecting polarizers generally include materials which transmit light of a first polarization and which reflect light of a second, different polarization. Reflecting polarizers include, by way of example and not of limitation, diffusely reflecting polarizers, multilayer reflective polarizers, and cholesteric reflective polarizers. The reflective polarizer (60) may be a wide-band reflective polarizer or a notch reflective polarizer. In other instances, the reflective polarizer (60) may be one or more of an absorbing linear polarizer, a multilayer polymeric reflective polarizer, or a laminate of a reflective polarizer, which substantially transmits light having a first polarization state and substantially reflects light having an orthogonal second polarization state. Substantially uniaxially oriented reflective polarizers are available from 3M Company under the trade designation Advanced Polarizing Film 5 or APF. Other types of multilayer optical film reflective polarizers (e.g., Dual Brightness Enhancement Film or DBEF available from 3M Company) may also be used. Other types of reflective polarizers (e.g., wire-grid polarizers) may also be used.

Figure 3:
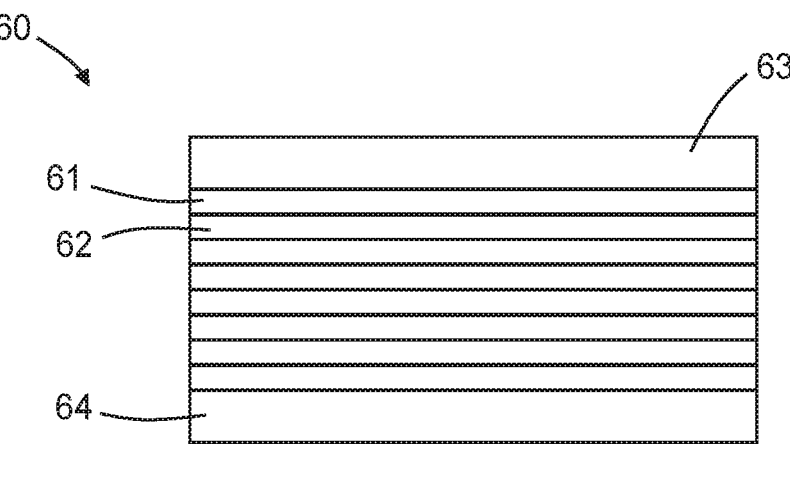
FIG. 3 schematically shows the construction of the reflective polarizer according to some aspects of the disclosure.

According to certain aspects, the reflective polarizer (60) may include a plurality of alternating first (61) and second (62) polymeric layers as shown in FIG. 3. The plurality of polymeric layers may number at least 50, or at least 100, or at least 150, or at least 200 in total. Each of the first (61) and second (62) polymeric layer may have an average thickness of less than about 500 nm, or less than about 450 nm, or less than about 400 nm. In some instances, the first and second polymeric layers may be alternately stacked isotropic and anisotropic layers. Reflective films (e.g., reflective polarizers) including a plurality of polymeric layers are described, for example, in U.S. Pat. No. 5,882,774 (Jonza et al.), U.S. Pat. No. 6,179,948 (Merrill et al.), and U.S. Pat. No. 6,783,349 (Neavin et al.), each of which is incorporated herein by reference to the extent that it does not contradict the present description. In some embodiments, the polymeric layers include one or more of a polycarbonate, a polymethyl methacrylate (PMMA), a polyethylene terephthalate (PET), a glycol-modified polyethylene terephthalate (PETG), a polyethylene naphthalate (PEN), and a PEN/PET copolymer.

In some aspects, the reflective polarizer (60) may include a skin layer (63, 64) disposed on opposite top and bottom sides of the plurality of alternating first and second polymeric layers (61, 62). The skin layer (63, 64) may have a thickness greater than about 1 micron. In some cases, the thickness of the core polymer layer may be about 10 to 300 microns, and the thickness of the skin layer may be 50 to 200 microns, but not limited thereto. The skin layer and the core polymer layers may be bonded with each other using adhesives. The skin layer (63, 64), for instance, may be made of polycarbonate or polycarbonate alloy, or polyethylene terephthalate (PET), or polystyrene (PS), or a combination thereof.

In some embodiments, the output of one set of retarder pixels may be transmitted from the reflective polarizer (60) while the output of the other set of retarder pixels may be reflected from the reflective polarizer (60). For instance, the reflective polarizer (60) may be configured to receive the first and second output images (50, 51) transmitted by respective first and second retarder pixels (40, 41) and substantially transmit the first output image (50) and substantially reflect the second output image (51) as can be seen in FIG. 1. In the illustrated embodiment, the reflective polarizer (60) transmits the first output image (50) along a third direction (z-axis) orthogonal to the first (x-axis) and second (y-axis) directions and reflects the second output image (51) along the first direction (x-axis).

In some aspects, the reflective polarizer (60) may be said to substantially transmit the first output image (50) polarized along the first direction (x-axis) if at least 60% of the first output image (50) is transmitted from the reflective polarizer (60). In some aspects, at least 70%, or at least 80%, or at least 90% of the first output image (50) may be transmitted from the polarizer (60). The reflective polarizer (60) may be said to substantially reflect the second output image (51) having a second orthogonal polarization state (y-axis) if at least 60% of the second output image (51) is reflected from the reflective polarizer (60). In some embodiments, at least 70%, or at least 80%, or at least 90% of the second output image (51) having the orthogonal polarization state is reflected from the polarizer (60).

The optical system (300), in some embodiments, may include a mirror (70) configured to receive and reflect the second output image (51) having a polarization in the orthogonal second direction (y-axis) and reflected by the reflective polarizer (60). In some aspects, a second retarder (80) is disposed between the reflective polarizer (60) and the mirror (70). In some embodiments, the second retarder (80) may be a quarter-wave retarder. In the illustrated embodiment, light carrying the second output image (51) with polarization in the second direction (y-axis) passes through the quarter wave retarder (80) and a substantial portion of said light is reflected by the mirror (70). For instance, the mirror may be a high reflectance mirror, having a reflectivity of greater than 99.5%. The light reflected by the mirror (70) passes through the quarter wave retarder (80) that converts the polarization in the second direction (y-axis) into the polarization in the first direction (x-axis). This double passing of the light carrying the second output image (51) through the quarter wave retarder (80) converts the polarization state of the second output image (51) to have the same polarization state as the first output image (50).

In certain embodiments, the second retarder (80) may be a film laminated on the reflective polarizer (60) or may be a coating applied to the reflective polarizer (60). For example, the second retarder layer (80) may be an oriented polymer film laminated to the reflective polarizer (60), or a liquid crystal polymer coating on the reflective polarizer (60). Suitable coatings for forming a quarter wave retarder include, but not restricted to, linear photopolymerizable polymer (LPP) materials and liquid crystal polymer (LCP) materials, as described elsewhere.

Where $L_A$ is the optical path length of the first optical path producing Image A, $L_B$ is the optical path length of the second optical path producing Image B, and f is the focal length of the mirror (70), $L_A<L_B<f$ would infer that Image A and Image B produced by the optical system (300) are both virtual images with Image B having a longer virtual image distance (VID). The differing distances relative to the mirror focal length for optical path $L_A$ and optical path $L_B$ produce the near-field and far-field virtual images, respectively.

Figure 4:
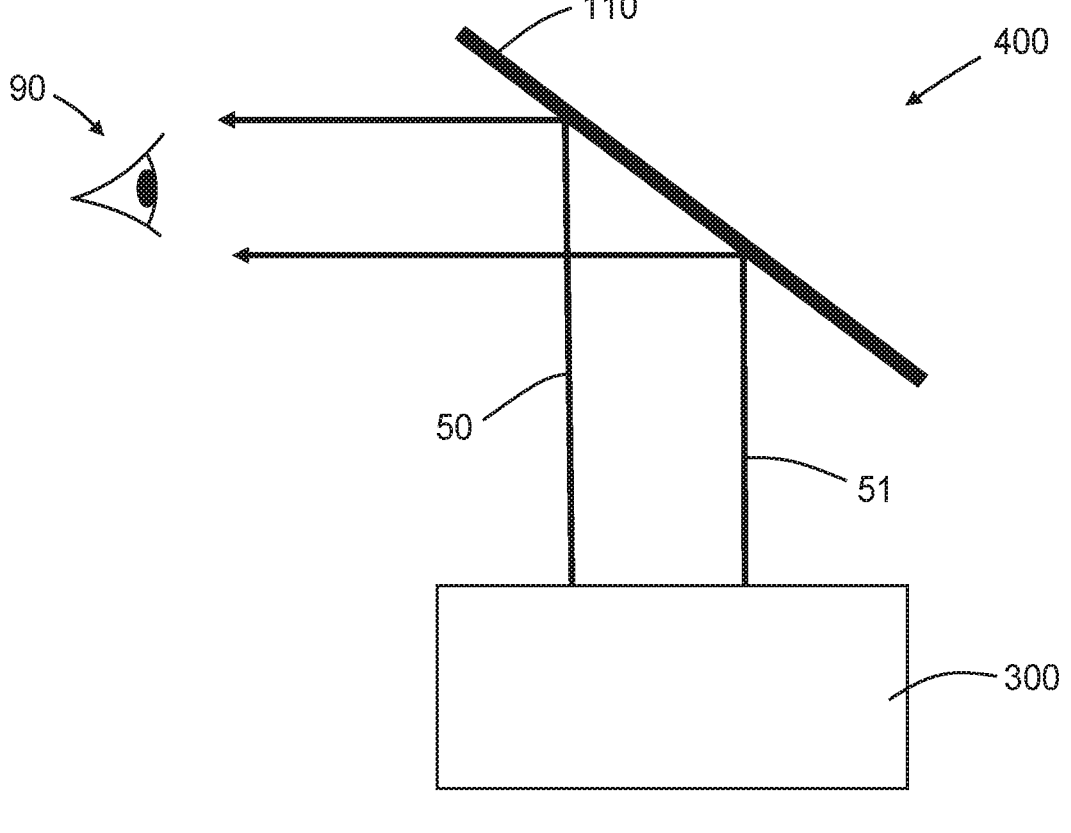
FIG. 4 schematically shows a heads-up display system including an optical system according to some embodiments.

Referring to FIG. 4, a heads up display (HUD) system (400) includes an optical system (300). The optical system (300) has been explained previously with reference to FIGS. 1 to 3. The HUD system (400) displays the virtual images produced by the first and second output images (50, 51) for viewing by a viewer (90). The HUD system (400) may be a HUD in a vehicle and the viewer (90) may be an occupant of the vehicle. In some aspects, the HUD (400) in a vehicle may include a windshield (110) of the vehicle. The output images including both near-field and far-field images from the optical system (300) may be displayed on the windscreen (110) for viewing by the viewer (90). The HUD (400) may be configured to display one or more of a vehicle operating information such as vehicle speed, navigation information such as directions and/or a map, ambient information such as temperature, radio station or track listing, communication information such as caller information, and road sign information or restrictions such as an effective speed limit, etc.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. An optical system comprising:
a display system configured to output a first output image polarized along a first direction and a second output image polarized along an orthogonal second direction comprising:
a display comprising pluralities of first and second display pixels interspersed with each other across the display, the first and second display pixels configured to emit superimposed different respective first emitted image and second emitted image polarized along the first direction; and
a retarder disposed on the display and comprising pluralities of first and second retarder pixels aligned and registered with the respective first and second display pixels in one-to-one correspondence, the first retarder pixels configured to receive the first emitted image, not change the polarization direction of the first emitted image, and transmit the first emitted image as the first output image polarized along the first direction, the second retarder pixels configured to receive the second emitted image, change the polarization direction of the second emitted image from the first direction to the second direction, and transmit the second emitted image as the second output image polarized along the second direction, wherein the retarder is a patterned birefringent polymeric film defining the first and second retarder pixels, the first retarder pixels having a thickness approximately twice that of the second retarder pixels; and a reflective polarizer configured to receive the first and second output images and substantially transmit the first output image and substantially reflect the second output image;

wherein the reflective polarizer comprises a plurality of alternating first and second polymeric layers numbering at least 50 in total, each first and second polymeric layer having an average thickness less than about 500 nm, and wherein the reflective polarizer further comprises a structural polymeric skin layer disposed on opposite top and bottom sides of the plurality of alternating first and second polymeric layers, the polymeric skin layer having a thickness greater than about 1 micron and comprising at least one of a polycarbonate, a polycarbonate alloy, a polyethylene terephthalate (PET), and a polystyrene (PS).

2. The optical system of claim 1, wherein the reflective polarizer transmits at least 80% of the first output image and reflects at least 80% of the second output image.

3. The optical system of claim 1, wherein the reflective polarizer transmits the first output image along a third direction orthogonal to the first and second directions and reflects the second output image along the first direction.

4. The optical system of claim 1, wherein the first retarder pixels are zero or full-wave retarders and the second retarder pixels are half-wave retarders.

5. The optical system of claim 1, wherein the first retarder pixels are twice as thick as the second retarder pixels.

6. The optical system of claim 1 further comprising a mirror configured to receive and reflect the second output image reflected by the reflective polarizer, and a second retarder disposed between the reflective polarizer and the mirror.

7. The optical system of claim 6, wherein the second retarder is a quarter-wave retarder.

8. A heads up display comprising the optical system of claim 1, wherein the heads up display displays the first and second output images for viewing by a viewer.

9. The heads up display of claim 8 being a heads up display in a vehicle, wherein the viewer is a passenger of the vehicle and the heads up display comprises a windshield of the vehicle.

* * * * *